United States Patent
Farone et al.

(10) Patent No.: US 6,846,947 B2
(45) Date of Patent: Jan. 25, 2005

(54) SULFHYDRAL CONTAINING COMPOUNDS AND METHODS OF USING SAME

(75) Inventors: William A. Farone, Irvine, CA (US); Tracy Palmer, Coto de Caza, CA (US)

(73) Assignee: Regenesis Bioremediation Products, Inc., San Clemente, CA (US)

(*) Notice: Subject to any disclaimer, the term of this patent is extended or adjusted under 35 U.S.C. 154(b) by 0 days.

(21) Appl. No.: 10/361,059

(22) Filed: Feb. 7, 2003

(65) Prior Publication Data

US 2004/0158095 A1 Aug. 12, 2004

(51) Int. Cl.$^7$ ............................................. C07C 321/00
(52) U.S. Cl. ............................................. 560/147; 560/154
(58) Field of Search ................................. 560/155, 156; 562/512, 553, 556, 557, 559

(56) References Cited

U.S. PATENT DOCUMENTS

| | | | | |
|---|---|---|---|---|
| 4,915,818 A | | 4/1990 | Yan | 208/251 |
| 5,034,202 A | | 7/1991 | Knollmueller | 423/181 |
| 5,503,826 A | * | 4/1996 | Lang et al. | 424/70.51 |
| 5,679,332 A | * | 10/1997 | Braun et al. | 424/70.51 |
| 6,077,432 A | | 6/2000 | Coppola | 210/611 |
| 6,180,023 B1 | | 1/2001 | Amer | 252/175 |
| 6,210,078 B1 | | 4/2001 | Redwine | 405/263 |
| 6,242,663 B1 | | 6/2001 | Ponder | 588/205 |
| 6,420,594 B1 | | 7/2002 | Farone et al. | |
| 2002/0006867 A1 | | 1/2002 | Ponder | 502/405 |

FOREIGN PATENT DOCUMENTS

| | | |
|---|---|---|
| EP | 0352420 B1 | 9/1992 |
| JP | 517431 | * 12/1992 |
| WO | WO 88/02738 | 4/1988 |

OTHER PUBLICATIONS

Ueyama et al., Polymer Journal (Tokyo, Japan) (1983), 15(7), 519–24 (See Abstract attached).*
Delnomdedieu et. al., Chem.Biol. Interactions 90 (2),139–55 (1994) (CA abst).
Cruse et al, Acta Cryst. 28(Pt.5), 1325–31 (1972) (CA abst).

* cited by examiner

*Primary Examiner*—Johann Richter
*Assistant Examiner*—Karl J. Puttlitz
(74) *Attorney, Agent, or Firm*—Cynthia H. O'Donohue

(57) ABSTRACT

The present invention relates to series of compounds with aqueous metal decontamination activity and their uses in removing metals from aqueous media. The compounds are esters of organic acids or alcohols with polyols that contain a sulfhydral group (—SH). The compounds release sulfhydral slowly into the water providing activity over extended periods of time and exhibit biodegradable characteristics. The compounds may be used to remediate aqueous media.

11 Claims, 4 Drawing Sheets

US 6,846,947 B2

SULFHYDRAL CONTAINING COMPOUNDS AND METHODS OF USING SAME

FIELD OF THE INVENTION

The present invention is directed towards a novel series of compounds with aqueous metal decontamination activity and their uses. More specifically, the invention relates to the area of esters of organic acids or alcohols with polyols that contain a sulfhydral group (—SH) which both reduces and binds the metals in water (such as arsenic, chromium, mercury and lead), to remove the metals from the aqueous phase and to immobilize the metals on soil or solid filter medium substrate. These novel compounds are characterized by releasing sulfhydral slowly into the water thus providing activity over long periods of time while exhibiting biodegradable characteristics such that the compounds of this invention do not remain in the water. The compounds may also be the basis of formulations which provide a time-release source of lactic acid and other materials which stimulate growth of microbes and facilitate bioremediation.

BACKGROUND OF THE INVENTION

The following description of the background of the invention is provided to aid in understanding the invention, but is not admitted to be, or to describe, prior art to the invention. All publications are incorporated by reference in their entirety.

The presence of arsenic and other toxic metals in ground water and other sources of water is an environmental concern. These toxic metals occur in groundwater, water sources and soil both naturally and as contaminants from various sources including but not limited to sources such as industrial wastes, byproducts of manufacturing, agricultural wastes and byproducts. A method of stabilizing mercury and other heavy metals in particulate material, such as sludge, is described by Broderick et. al. in US 200/0106317A1. The described method uses a metal reagent in addition to sulfur-containing compound and proposes agitating these materials plus others in an oxygen atmosphere. In this process the excess sulfides that were added to remove the metals have to be removed also as they become contaminates.

There are known methods for removing arsenic and other toxic metals from ground water and contaminated water which differ slightly for each metal contaminant. As an example, one method for arsenic involves the reduction of arsenic to the arsenite form and then complexation by resins, clays, carbon or zeolites. When the arsenic is trapped in such filtration systems, the complexing system must be removed along with the entrapped arsenic. These systems have not proven very useful for use in aquifers due to the mechanical complexities. Sulfhydrated cellulose (Lindahl et. al., WO8802738) was used in a bed as an ion exchange treatment to adsorb mercury, cadmium, and lead from solutions. The filter material was then stripped with aqueous 1M or greater HCl for conventional precipitation as sulfides. There have been similar other applications of the ion exchange technique (Furuta et. al., EP352420; Yan, U.S. Pat. No. 4,915,818) to remove metals from liquid hydrocarbons. However these methods are not useful to remediate water in situ.

Zero valent iron has been proposed to treat groundwater and surface streams for decontamination (Ponder et. al, US 20020006867A1 and U.S. Pat. No. 6,242,663). Another presently used common technique for decontaminating aquifers is the pump-and-treat method. This method utilizes a series of extraction wells drilled into a contaminated aquifer. The contaminated water is drawn through an extraction well, treated to remove or degrade the contaminant, and then returned to the aquifer through one or more injection wells or discharged to sewers or other non-origin points. This method can be both time consuming and cost-prohibitive A treatment method for arsenic in water with proteins derived from microbes that routinely process arsenic via metabolic process has been suggested by some. This presently appears to be a process that is too expensive to have practical application for bioremediation. Although a large number of genetic studies have been done on microbes that can process As or other metals (e.g. Hg), the basic problem for the use of any of the microbes with metals is to devise a relatively inexpensive means of reducing the contaminating metals with the microbes and then binding the reduced metals to a substrate.

The approach of growing organisms to extract the polypeptides or synthesizing complex polypeptides is costly. Growing organisms for extraction of products from the organisms is viable when the value of the extracted products, such as pharmaceuticals, is expected to be high. However, in the case of treating soil and water contamination, large volumes must be treated over extended periods and cost has proven to be a limiting factor.

All of the previously mentioned methods have shown serious shortcomings. Addition of complexing materials has the problem that essentially all of the materials is released at once. Thus, frequent addition of the chosen material is needed to keep a sufficient concentration in the contaminated area over time. The constant injection of high volumes of solutions will increase the volume of the system or aquifer and thereby potentially cause further spread of the contamination. Special measures are required to deoxygenate the water and solutions which are injected, to ensure maintaining the anaerobic atmosphere which fosters the reduction. Thus a need exists for a safe, cost-effective method for removing these contaminating materials from ground water and soils.

SUMMARY OF THE INVENTION

Figure 1:
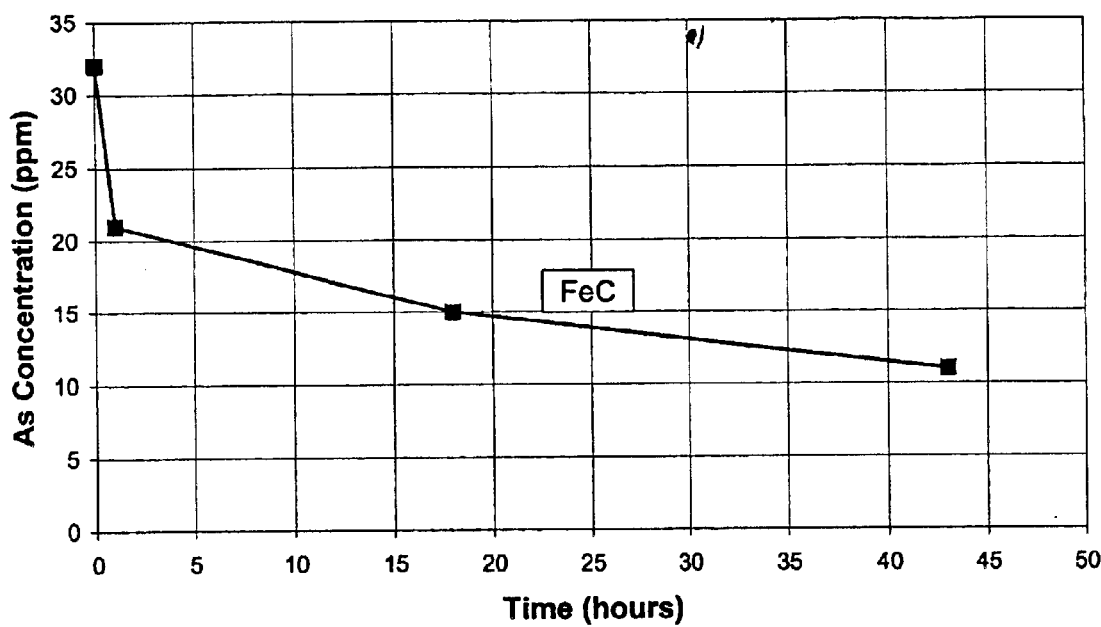
FIG. 1. The rate of reduction of arsenic in hours by ferrous cysteinate (FeCys).

The present invention relates to compounds and compositions characterized by their ability to release sulfhydral containing carboxylic acids slowly over time. The present invention also relates to formulations comprising the compounds, as well as methods for their use in aiding bioremediation of media contaminated by metals.

These compounds are esters of a carboxylic acid of Formula I with a polyol containing 2–8 hydroxyl (—OH) groups;

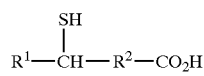

Formula I wherein $R^1$ is lower alkyl; and $R^2$ is selected from the group consisting of lower alkyl, —CH(NH$_2$)—, CH$_2$CH(NH$_2$)

$CH_2$—, —$CH_2CH_2CH(NH_2)$—, and —$CH(NH_2)$ $CH_2CH_2$—. In one aspect the compound of Formula I is selected from the group consisting of methionine and cysteine and the polyol is selected from the group consisting of glycerol, xylitol, and sorbitol. In a different aspect the compound of Formula I is cysteine and the polyol is sorbitol.

An additional compound is that of an ester of a compound of Formula II with a polyol containing 2–8 hydroxyl (—OH) groups:

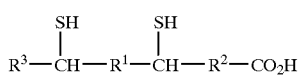

Formula II wherein $R^1$ and $R^3$ are lower alkyl; and $R^2$ is selected from the group consisting of lower alkyl, —$CH(NH_2)$—, $CH_2CH$ $(NH_2)CH_2$—, —$CH_2CH_2CH(NH_2)$—, and —$CH(NH_2)$ $CH_2CH_2$—. In one aspect the compound of Formula II is 6,8-dimercaptooctanoic acid and the polyol is selected from the group consisting of glycerol, xylitol, and sorbitol.

In a further aspect of this invention these polyol ester compounds of Formula I or Formula II are used to treat water or soil that is contaminated with metals, including but not limited to arsenic, chromium, mercury, and lead. In another aspect these polyol ester compounds of Formula I or Formula II when mixed with a polylactate release compound composition are used to treat water or soil that is contaminated with metals, including but not limited to arsenic, chromium, mercury, and lead.

The present invention also provides a formulation comprising 1–99% by weight of the polyol ester compound of Formula I or Formula II and 1–99% by weight of a polylactate release compound composition.

The present invention also provides for a method of aiding bioremediation of metallic contaminants remediated in a medium, comprising contacting the medium and applying a composition comprising a sulfhydral containing ester of a carboxylic acid. In one aspect, the composition comprises an ester of sulfhydral containing carboxylic acid and a polyol selected from the group consisting of glycerol, xylitol, and sorbitol. In another aspect, the composition comprises an ester of cysteine and sorbitol. The method may also utilize formulations, as described above, comprising the polyol ester of sulfhydral carboxylic acids and polylactate release compound composition. The medium is selected from the group consisting of an aquifer, a bioreactor, soil, an industrial process, a wastestream, a body of water, a river, and a well.

In one aspect when the medium is underground, the method of aiding bioremediation comprises injecting the composition or formulation into the medium with a high pressure pump. In another aspect the method comprises the steps of packing the composition into tubes or canisters having openings, holes or slits in the sides thereof, and placing the canisters into holes drilled into the ground.

In accordance with the present invention there is provided a method of aiding remediation of metals in a medium, comprising applying a polyol sulfhydral-containing ester to the medium. In one aspect, the polyol ester is selected from the group consisting of glycerol tricysteinate, sorbitol tricysteinate, ferrous cysteinate, and sorbitol hexacysteinate. In another aspect the medium is selected from the group consisting of an aquifer, a bioreactor, soil, an industrial process, a wastestream, a body of water, a river and a well.

Definitions

In accordance with the present invention and as used herein, the following terms are defined with the following meanings, unless explicitly stated otherwise.

The term "lower" referred to herein in connection with organic radicals or compounds, respectively, defines such as with up to and including 6, preferably up to and including 4, and advantageously one to three carbon atoms. Such groups may be straight chain, branched, or cyclic.

The term "carboxyl" refers to —C(O)OH.

The term "carboxy esters" refers to —C(O)OR where R is alkyl optionally substituted.

The term "alkyl" refers to saturated aliphatic groups including straight-chain, branched chain, and cyclic groups. Alkyl groups may be optionally substituted. Suitable alkyl groups include methyl, isopropyl, ethyl, and cyclopropyl. Additional suitable alkyl groups include —$CH_2$—, —$CH_2CH_2$—, and —$CH(CH_3)$—.

The term "optionally substituted" or "substituted" includes both alkyl and aryl groups substituted by one to two substituents, independently selected from lower alkyl, oxygen, sulfur, nitrogen, and halogens.

The term "sulfhydral" refers to —SH.

The term "sorbitol cysteinate" refers to all compounds that are esters of cysteine and sorbitol.

The term "enhancing" refers to increasing or improving a specific property.

The term "administered simultaneously" refers to the administration of one composition at or near the same time in which another composition is administered. Preferably administration is within 30 minutes of one another.

The term "therapeutically effective amount" refers to an amount that has any beneficial effect in remediating aquifer, soil, wastestream, river(s) and river water, well(s) and well water, and any body of water.

The term "biodegradable" has its normal and usual meaning and may also refer to compounds that are readily utilized or degraded by naturally occurring microorganisms.

The term "polyol" refers to an alcohol having more than one hydroxyl radicals including polyethers, glycols, polyesters and castor oil.

The term "polylactate release compound composition" refers to compositions that serve as substrates that release hydroxy acid slowly over time as disclosed in U.S. Pat. No. 6,420,594 (incorporated by reference in its entirety). The composition further may contain one or more compounds selected from the group consisting of nutrients, buffers and pH modifiers, ethylene, chelating agents, surfactants, vitamins, enzymes, compounds that inhibit competing microorganisms, and bacteria and other microbes.

The terms "system" and "medium" refer to not only to sites, systems and media in nature such as soils, aquifers, lakes, rivers, and the like, but also to man-made systems including reservoirs, holding tanks, bioreactors, wastestreams, industrial processes, wells, and the like.

The following well known chemicals are referred to in the specification and the claims. Other abbreviations used and names are provided.

As: arsenic
Hg: mercury
Cr: chromium
Cu: copper
Pb: lead
Fe: iron (ferrous or ferric)
FeCys: ferrous cysteinate
SCys: sorbitol tricysteinate
SHC: sorbitol hexacysteinate
ASV: Aquifer Simulation Vessels
BAL: British Anti-Lewisite
GPL: Glycerol polylactate

DETAILED DESCRIPTION OF THE INVENTION

In view of the existing methods, a need remains for a method to provide reduction of metals in water that is cost-effective, safe, efficient, and requires a minimum of active management to perform. Furthermore, the method would preferably provide a known amount of sulfhydral containing compound, the release of which is controlled over time, and a high quantity of sulfhydral per unit weight or volume of substrate used. The present invention provides novel compounds, formulations, and methods that have some or all of these desirable qualities.

A series of compounds have been developed which can interact with contaminating metals in water (including but not limited to arsenic, chromium, mercury and lead) to remove these metals from the aqueous phase and immobilize the metals on soil or a solid filter medium substrate. The compounds are esters of organic acids or alcohols that contain a sulfhydral group (—SH) and which both reduces and binds the metals. In another aspect the compounds are characterized by being released slowly into the water thus providing activity over long periods of time. In a different aspect the compounds are additionally characterized by being utilized by naturally occurring microorganisms (biodegradable) such that the compounds do not remain in the water. The metals are deposited as stable salts bound to the solid phase (e.g. soil or filter). Examples of compounds, which meet the requirements, are polyol cysteinate esters and relative insoluble cysteinate salts.

For some metals, such as chromium, reduction of the chromate to the insoluble chromite occurs in any anaerobic condition. It was shown that the compounds of this instant invention increased the rate at which this reduction occurred. Polyol polylactates (see U.S. Pat. No. 6,420,594) after reduction by bacteria have also been shown to perform this function for chromate. A need exists to have compounds like the polylactate esters that were specifically targeted to metals that are or could be considered contaminants. Further a need exists for compounds that could be used alone or in combination with the polylactate esters to reduce or eliminate the concentration of metals in water.

The characteristics of an ideal compound consist of:
1. Release a metal complexing agent slowly over a long period of time to continually react with metals in solution.
2. Reduce the metal.
3. Complex the metal to a form that can be bound by soil, filter medium or other solid substrate.
4. Be readily utilized by microorganisms.
5. Leave the metal in a mineral form bound to the soil, filter medium or other solid substrate.

The novel compounds of this instant invention were found to exhibit many of the desired characteristics when used alone or in combination with the polylactate esters.

The sulfhydryl (—SH) groups in various organic chemicals have long been known to reduce arsenate to arsenite. Sulfhydryl groups are also known to bind arsenite. In addition sulfhydryl groups are known to bind and remove mercury (Hg). The reactions appear to be quite general for heavy metals and are not limited or specific to arsenic or mercury. Similar reactions occur with copper, zinc, cadmium, etc. The sulfhydryl groups were originally known to remove mercury and hence the name "mercaptan" (capturing mercury) for the —SH group in some chemical compounds.

Based on one detailed study (M. Delnomdedieu et al, *Chemico-Biological Interactions* 90: 139–55(1994)) two moles of SH per mole of As are required to reduce the As(V) to As(III) and then three moles of SH to complex the As(III) in the arsenite form. The —SH group can also attack other reducible species such as Hg and will be affected by Fe. In any treatment system wherein the —SH group containing compounds are utilized, a therapeutically effective amount must be added to cover the various metal interactions that can occur.

Delnomdedieu et al used glutathione as the source of the SH group from the amino acid cysteine in a trimer of glycine-cysteine-glutamine (glutathione). However, there is nothing special about this molecular arrangement as Cruse and James find arsenite binding for 1,2-dithioglycerol, 1,4-dithiothreitol, 1,4-dithioerythritol and 1,3-dithioglycerol (W. B. T. Cruse and M. N. G. James, *Acta Cryst*. B28: 1325–31 (1972)).

Cysteine Example

A simple molecule upon which to base the desired substance is the amino acid, cysteine, as shown in the formula below:

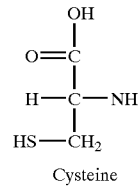

Cysteine

Cysteine is naturally occurring, relatively inexpensive and can be subjected to easy and affordable chemical modification. Cysteine cannot be used directly for metallic bioremediation because it 1) is soluble in water, 2) reacts in air by hydrolysis to form cystine and 3) is not suitable for long-term placement in various media for remediation. Even in the simple polypeptide glutathione, where it is the central amino acid of the trimer, the glutathione is still water soluble and does not have the desired properties for water treatment if that water treatment is intended to remove the As from the solution as opposed to simply complexing it in solution.

Cysteine is used as a model for organic carboxylic acids that contain one or more sulfhydryl groups. The esterification chemistry is general and well known to those skilled in the art and although cysteine is used as the model any sulfhydryl containing carboxylic acid could be used. Making larger molecules containing cysteine can most economically be accomplished by making use of the carboxyl group to make insoluble high viscosity esters containing cysteine. One set of esters includes those that can be made by direct acid catalyzed esterification involving removal of water at moderate temperatures.

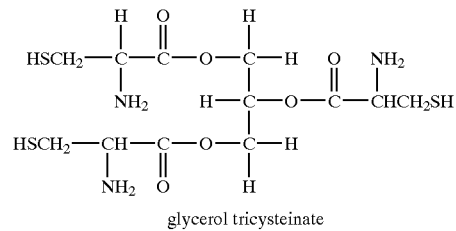

glycerol tricysteinate

An example of an insoluble high viscosity cysteine containing ester is glycerol tricysteinate made by the condensation of 3 moles of cysteine with one mole of glycerol. Since glycerol is a liquid, no external solvent is needed for the acid catalyzed dehydration.

The chain length of the polyol can be increased. For example, xylitol can be used (liquid above 94.5° C.) for a pentamer and sorbitol (liquid above 112° C.) for a hexamer.

There can also be limited reaction between individual cysteine molecules to form a small quantity of "polycysteine" before esterification takes place. The addition reaction of amino acids requires activation of the carboxyl group by conversion to the acid chloride. Phosphorus trichloride ($PCl_3$), phosphorus oxychloride ($POCl_3$) or thionyl chloride ($SOCl2$) is used for this conversion. These chloride agents increase the costs of synthesis and additionally create byproduct streams requiring disposal. It was found that without activation by $PCl_3$, $POCl_3$, or $SOCl_2$ there were only trace amounts of polycysteine formed. The formation of this polycysteine was found not to be a detriment and the presence of the polycysteine added to the number of sulfhydryl groups per molecule. Thus in an additional aspect polycysteine is useful for the purposes of this invention.

For larger molecules that maintain viscosity and also have reduced solubility, transesterification chemistry can be used to transfer the cysteinate from one ester to another. For example, ethyl or methyl cysteinate can be synthesized from cysteine and ethanol or methanol respectively, and then the cysteine ester can be reacted with sucrose in DMSO solvent with a basic catalyst ($K_2CO_3$) to provide a sucrose cysteinate ester containing up to eight cysteine groups per molecule. The method of transesterification from a simple cysteine ester can also be used without a solvent in cases where the polyol is liquid. In place of the simple esters of cysteine the alkali salt of cysteine such as potassium cysteinate can be used acting as both the basic catalyst and the source of cysteine. This method usually has lowered yields over use of the organic esters but is less expensive to carry out.

Other Sulfhydryl Containing Acids.

In place of the cysteine molecule any organic acid that contains a sulfhydryl group can be used. Cysteine was selected as the model in this instant invention because it is readily available from hydrolysis of proteins. The compound frequently referred to as BAL:

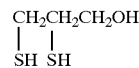

British Anti-Lewisite was used to treat Hg and As heavy metal poisoning during World War I. Similar carboxylic acid compounds could be used in place of cysteine. As an example, thioctic acid (lipoic acid) is a natural product required for the growth of certain microorganisms and it can be synthesized from ethyl-6, 8-dibromooctanoate through the intermediate 6, 8-dimercaptooctanoic acid:

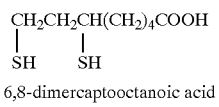

6,8-dimercaptooctanoic acid

Compounds with multiple —SH groups are usable in place of the cysteine in the polymers above. In the case of 6, 8-dimercaptooctanoic acid the resultant species would have twice the effectiveness per monomer unit than cysteine. The reduction of naturally occurring thioctic acid gives the 6, 8-dimercaptooctanoic acid. The compound would be more expensive to obtain via synthesis or extraction and thus is not a preferred embodiment of this method.

Any carboxylic acid that can be made with a bromine atom attached to the backbone of the organic acid can be converted into a mercapto acid by reaction with 1) $CH_3COSK$ followed by 2) KOH. This two step reaction provides the starting material for the sulfhydryl polymer. Therefore, these methods can also provide the required starting material as well as natural cysteine. Bromination of unsaturated fatty acids followed by these two steps may provide acids that are cost effective compared to cysteine. The availability of inexpensive bromo acids would also provide another pathway to the disclosed sulfhydryl acids.

Method for Bioremediation

These novel sulfhydral containing ester compounds can either be injected into the ground for treatment of aquifers, either alone or in combination with other treatments, or used to coat filters of zeolites or resins for subsequent removal of arsenic or other metals in filtration systems. In a filter system the material collected on the filter can be removed from the filter if desired by hydrolysis of the ester links to give the soluble arsenate or metallic complexes of sulfhydral compound and the soluble polyol. These materials can be washed out of the filter and the metal collected in more concentrated form. The filter could then be recoated with new polymer for further use in metallic removal.

When used in an aquifer the injection of these compounds cause the metal, for example arsenite, to become bound to the soil substrate. Since these —SH-containing compounds are a good nutrient substrate for microorganisms, the metallic or arsenic moieties become affixed to the soil as the complex is metabolized. Since the soil microorganisms are sessile and thus are bound to the soil, the metal will become mineralized with the inorganic remnants of the microbes as the colonies proliferate and then eventually die off.

For some applications even larger molecules may be desired. This can be achieved by copolymerization with a dibasic acid such as succinic acid, maleic acid or malonic acid. A small amount of these dibasic acids added to the reaction mixtures "cross links" some of the polyols thus increasing the average molecular size. In the case of the direct reaction with acid catalyst these dibasic acids can be added directly to the reaction mixture. In the case of transesterification the dibasic acids should be added as the methyl esters, the ethyl esters or the alkali salts.

In another aspect the environment where the compounds are used should be kept low in oxygen since, for example, conversion of the cysteine side chains to cystine dimers can occur under select stearic conditions known to those skilled in the art. This conversion reduces the effectiveness of the compounds. Aquifers operate in anaerobic conditions and this condition is preferable. In filter systems aeration of the water should not be done until after the remediation treatment has been completed and the metals removed. This is consistent with present normal practice not to oxidize arsenic and other metals and does not incur additional expenses or inconvenience to water treatment systems.

In another aspect a need exists for a method to provide sulfhydral groups capable of binding metals that is cost-effective, safe, efficient, and requires a minimum of active management to perform. Furthermore, the method would preferably provide a known amount of —SH, the release of which is controlled over time, and a high quantity of —SH per unit weight or volume of substrate used. The present invention provides novel compounds, formulations, and methods that have some or all of these desirable qualities.

The present invention provides for a family of novel compounds to serve as substrates which release —SH containing compounds slowly over time. The compounds of the present invention may be used to provide a —SH source for bioremediation of metals in aquifers, soils, wastestreams, industrial processes, or other systems. The present invention also provides for formulations based on the family of novel compounds, as well as methods for their use in promoting bioremediation of contaminants.

Formulations

The present invention further provides for formulations based on the polylactate esters, as described in U.S. Pat. No. 6,420,594, that serve as a source of lactic acid and other materials that are desired in a particular application, as determined by one of skill in the art. In one aspect the formulations are comprised of polylactate esters of the sulfhydral containing polyol. Formulations may also comprise one or more diluents, such as water, glycerin or alcohols. Additionally, the polylactate formulations may contain inorganic salts, nutrients such as yeast extract, urea, potassium-containing compositions, nitrogen-containing compositions, phosphorous-containing compositions, sulfur-containing compositions, molybdenum salts, iron salts, zinc salts, copper salts, buffers and pH modifiers such as sodium carbonate and potassium carbonate, ethylene, chelating agents, surfactants, vitamins such as $B_{12}$, enzymes such as lipase and esterase, compounds that inhibit competing microorganisms, and bacteria and other microbes. The materials other than the sulfhydral esters are not required for remediation, but they can provide an improved or more consistent environment for bioremediation.

In one aspect the formulation for remediation consists of cysteine and sulfhydral containing carboxylic acid. In another aspect the formulation for remediation consists of the novel sulfhydral containing esters of this invention. The compounds of this invention are combined with polylactate esters to provide additional formulations.

Compounds/Compositions Prepared by the Invention

These compounds are an ester of a carboxylic acid of Formula I with a polyol containing 2–8 hydroxyl groups;

Formula I

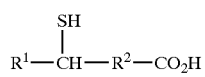

wherein $R^1$ is lower alkyl; and $R^2$ is selected from the group consisting of lower alkyl, —CH($NH_2$)—, $CH_2CH(NH_2)$ $CH_2$—, —$CH_2CH_2CH(NH_2)$—, and —CH($NH_2$) $CH_2CH_2$—. In one aspect the compound is an ester of methionine or cysteine and the polyol is glycerol, xylitol, sorbitol. In a different aspect the compound of Formula I cysteine and the polyol is sorbitol.

An additional compound is that of an ester of a compound of Formula II with a polyol containing 2–8 hydroxyl groups:

Formula II

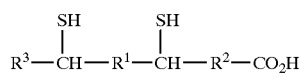

wherein $R^1$ and $R^3$ are lower alkyl; and $R^2$ is selected from the group consisting of lower alkyl, , —CH($NH_2$)—, $CH_2CH(NH_2)CH_2$—, —$CH_2CH_2CH(NH_2)$—, and —CH ($NH_2$)$CH_2CH_2$—. In one aspect the compound of Formula II is 6,8-dimercaptooctanoic acid and the polyol is selected from the group consisting of glycerol, xylitol, and sorbitol. In a further aspect the compounds of Formula I or the compounds of Formula II are used in a formulation with a polylactate release compound composition to treat water or soil that is contaminated with metals, such as but not limited to arsenic, chromium, mercury, and lead.

For the tricysteinate of either glycerol or sorbitol, three mols of cysteine hydrochloride were reacted with 1 mol of glycerol or sorbitol to yield 1 mol respectively of glycerol tricysteinate or sorbitol tricysteinate and 3 mols of water. Ferrous cysteinate was found to only use two mols of cysteine hydrochloride per mol of ferrous sulfate. These reactions require a suitable acid catalyst such as but not limited to hydrochloride acid. Other acid catalysts that may be used are phosphoric, sulfuric, and sulfonic acids.

1.0 Synthesis of Glycerol Tricysteine 9.71 grams of glycerin was placed into a 100-ml round bottom flask with 4.69 grams of 36% hydrochloric acid. A distillation apparatus was connected to the round bottom flask. The temperature was set at 120° C. Over a period of 30 minutes 47.29 grams of cysteine hydrochloride was added. When the temperature reached 100° C., all of the cysteine hydrochloride was in solution. The reaction ran until there was no further removal of water. Glycerin (50%) is then added to product.

Reaction time: four hours
Water removed: 9.1 grams
Color: amber 1.1. Synthesis of Sorbitol Tricysteinate 48.45 grams of 36% hydrochloric acid was added to the one-liter round bottom distillation flask. 184.59 grams of sorbitol was added to the flask. The temperature was set at 120° C. A total of 472.50 grams of cysteine hydrochloride was added over a period of 30 minutes. When the temperature reached 70° C., the vacuum was turned on and set at 29.2 inches of mercury. After two hours 111.02 grams of water had been removed and the reaction was stopped. The product was analyzed by LC to determine free cysteine present. Glycerin (50%) is then added to product. Cooling without the glycerin gave a very hard product.

Reaction time: 2 hours
Water removed: 111.02 grams
Color: brown amber
Free cysteine: 4.51%
LC conditions:
Column: Prevail C18; eluent=5 mM Heptafluorobutyric acid adjusted to pH 1.0 with 0.7% trifluoroacetic acid; elution time, cysteine=220 sec.; elution time, proline=333 sec.; detection=conductivity.

1.2 Synthesis of Sorbitol Hexacysteinate 34 grams of 36% hydrochloric acid was added to a two-liter round bottom distillation flask. 227 grams of sorbitol was added to the flask. The temperature was set at 120° C. After the sorbitol was completely melted, 906 grams of L-cysteine was added. The reaction proceeded for 1.5 hours at 120° C. After 1.5 hours vacuum was connected and set at 750 mm of mercury to pull off the remaining water. The vacuum ran for 30 minutes. Glycerin (50%) is then added to product. Free sorbitol was found to be 4.13%.

Melting Point: 52–60° C.
Decomposes above 200° C.
Solubility in water: 10 g./L.
pH: 2.1
Density: 1.30–1.40 g./mL
Reaction time: 2 hours
Water removed: 135 grams
Color: dark brown amber
Product density: 1.30 grams/milliliter 1.3 Synthesis of Ferrous Cysteinate 157.61 grams of cysteine hydrochloride and 139.01 grams of iron sulfate were placed into a two-liter beaker. One liter of distilled water was added and the solution was mixed. The pH was adjusted to 7.0 using calcium hydroxide. At pH 2 the color of the solution was white, at pH 4.5 the color was mustard and at pH 5.0 the colored turned brown. 96.01 grams of calcium hydroxide were required to reach pH 7.0. The resulting product was filtered through a Buchner funnel using a Whatman #4 filter paper and vacuum. The solids were discarded and the solution was placed into a two liter round bottom vacuum distillation system. The temperature was set at 75° C. At 32° C. and 29.1 inches of mercury water was distilled off. After removal of the water, 275.02 grams of ferrous cysteinate was obtained.

Color: Brown
Density (50% Glycerin)~1.25 grams/mL

REMEDIATION EXAMPLES

Example A

The formulation of glycerol polylactate (GPL) and sorbitol hexacysteinate was produced during the synthesis process of the glycerol polylactate. Both materials are in 50% glycerin during their respective processes. The formulation containing both GPL and sorbitol cysteinate is generated by adding 5% by weight of sorbitol cysteinate in glycerin to 95% by weight of GPL in the reactor. The formulation is mixed in the reactor.

Color: Amber semi-solid
Density (50% Glycerin): 1.35 gm./mL
Solubility: Acetone and DMSO Example B Similarly as in Example A a formulation of glycerol tripolylactate and ferrous cysteinate was made.

Color: Amber semi-solid
Density (50% Glycerin): 1.25 gm./mL
Solubility: Acetone and DMSO Example C 10.02 grams of ferrous cysteinate synthesized as in 1.4 were added to a 250 ml. flask which contained 150 ml of 32 ppm of As initially added as arsenic trioxide. The rate of reduction of As is shown in FIG. 1. The 32-ppm solution of As was prepared by using 0.08 grams of arsenic trioxide to which 3.0 grams of concentrated hydrochloric acid was added. This prepared the soluble arsenate. The solution was heated and diluted to one liter with distilled water. The As concentration was measured over time using atomic absorption.

Result: In less than 45 hours the concentration of As was reduced by half from 32 ppm to less than 15 ppm. See FIG. 1

Example D

A system which had two connected 250 ml flasks, one with liquid and soil and the other with a reservoir of liquid, was used. The liquid flowed between the 2 flasks. Samples were taken from the flask without the soil to determine the amount of Cu, As and Cr present in the aqueous phase. The liquid in the flask without soil was sampled periodically and the Cu, Cr and As content measured by Atomic Absorption Spectroscopy. A unimolar ratio of copper chromate and copper arsenate was used as being representative of chromated copper arsenate. The level of contamination was selected so that the As component was about 30 mg/L. After the system was set up the As component was determined to be 28.3 mg/L. The Cu and Cr were approximately 25 mg/L and 15.5 mg/L, respectively.

Figure 2:
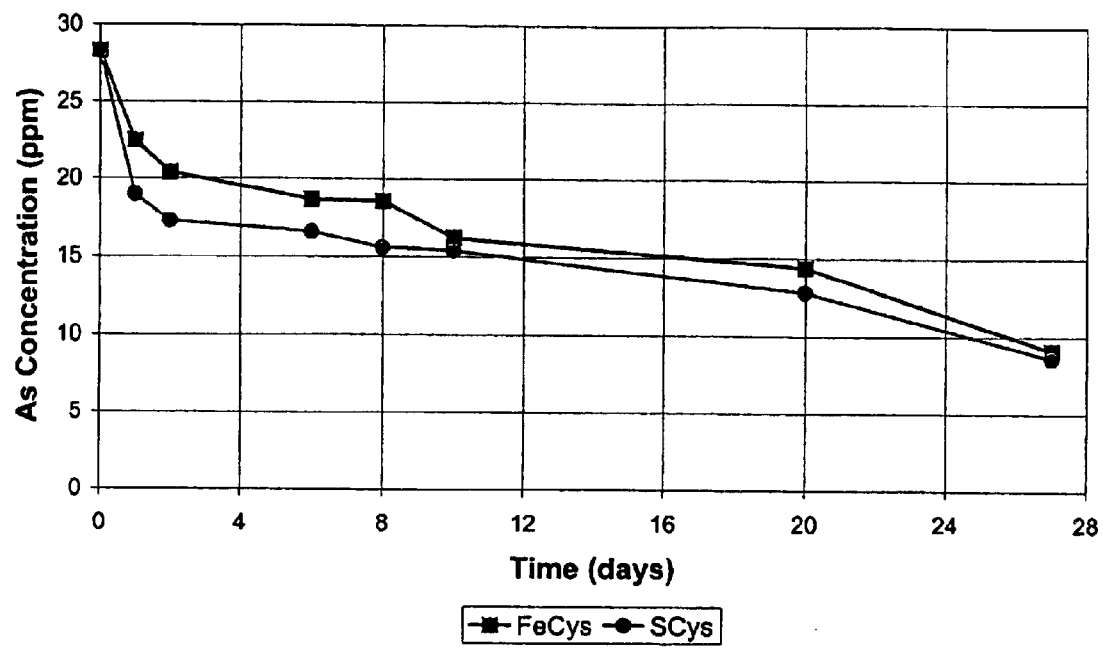
FIG. 2. The rate of reduction of arsenic in chromated copper arsenate in days by ferrous cysteinate (FeCys) and sorbitol tricysteinate (SCys).
Figure 3:
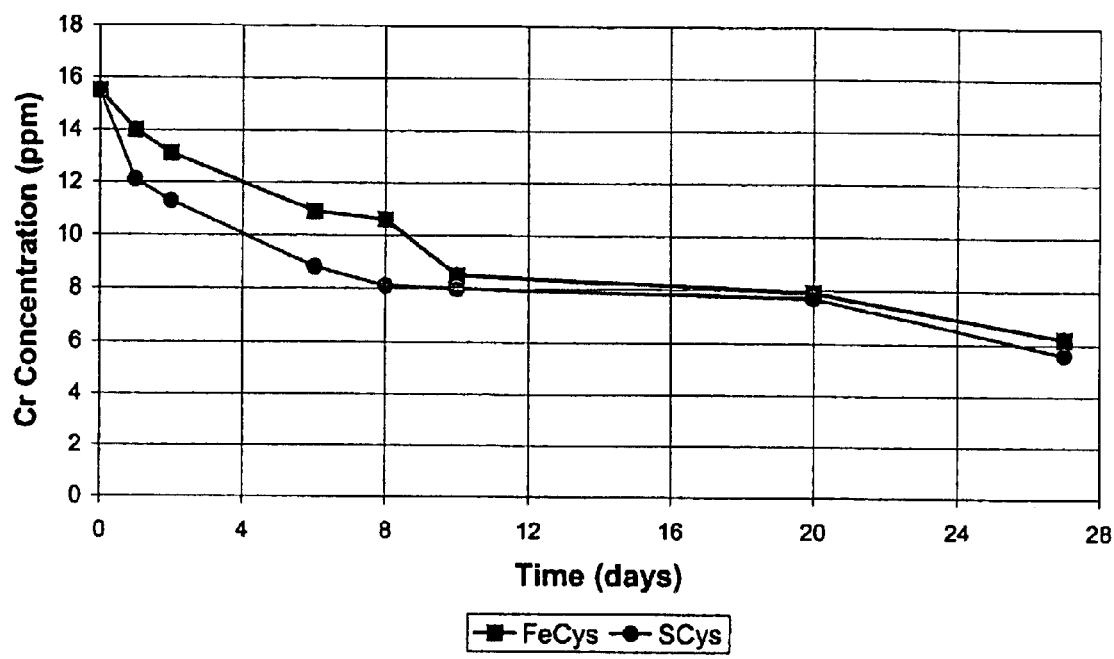
FIG. 3. The rate of reduction of chromate in chromated copper arsenate in days by ferrous cysteinate (FeCys) and sorbitol tricysteinate (SCys).
Figure 4:
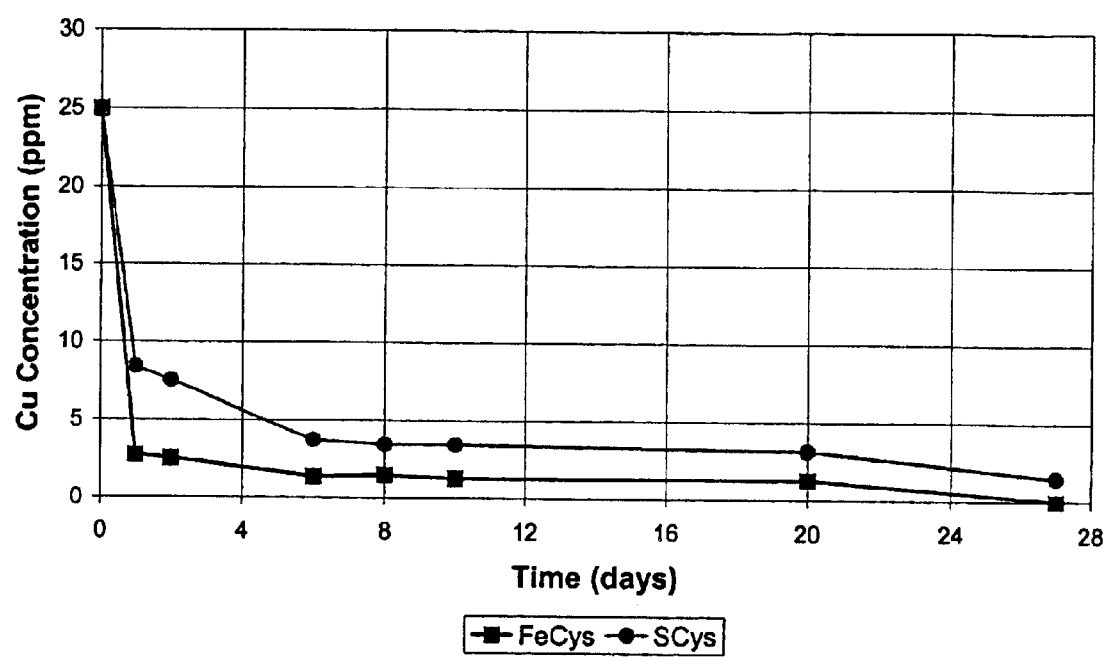
FIG. 4. The rate of reduction of copper in chromated copper arsenate in days by ferrous cysteinate (FeCys) and sorbitol tricysteinate (SCys).

Ferrous cysteinate and sorbitol tricysteinate were both used in this system. The time course of the remediation is shown in FIGS. 2–4. FIG. 2 contains the arsenic results, FIG. 3 contains the chromium results and FIG. 4 contains the copper results. All three of the metals in the combined solution were remediated by the ferrous cysteinate and the sorbitol tricysteinate.

Between days 10 and 20 the low water levels in the flasks adversely affected the effectiveness of the pumps. Thus, the decrease in rate of removal from the solution after day 10 was partially due to decreased adsorption by the soil being exposed to less water. In the ground the rates of removal should actually be higher. Denser soil and slow aquifer flow increases the rate of removal of the contaminants.

Results: The As concentration over 26 days decreased from approximately 28 mg./L to less than 10 mg/L, the Cr concentration decreased from 15 mg/L to approximately 6 mg/L, and the Cu concentration decreased from 25 mg/L to less than 1 mg/L.

Example E

Pilot Plant Scale-Chromated Copper Arsenate

A tube 6 foot long and 6 inches in diameter was packed with soil. These tubes simulate the flow in an aquifer below ground and are referred to as Aquifer Simulation Vessels (ASV). The ASV has sample ports along the bottom at every 6-inch interval to allow sampling as water flows through the tube. Contaminated water is allowed to flow through the tube. As the water flows through the tube, the water within the space pockets of the soil is tested and when the soil with the tube is fully contaminated the flow was stopped. The soil pockets (pores) were full of contaminants from the water. At that point either ferrous cysteinate or sorbitol hexacysteinate was injected just ahead of the first port with no flow in the system.

A separate tube was used for each of the two materials tested.

Both ferrous cysteinate and sorbitol cysteinate were determined to provide effective remediation of As, Cr and Cu. Table 1 gives the initial values of the solution that was used to contaminate the ASVs.

TABLE 1

| Initial Values (mg/l) of Solution Injected into ASV | |
|---|---|
| | Initial |
| As | 25.7 |
| Cr | 15 |
| Cu | 4.2 |

Initially the soil pockets (pores) were filled with this solution as described. Either ferrous cysteinate or sorbitol hexacysteinate was injected into the soil containing tube. The concentration of contaminants at each sample port was measured over a 30 day period. The system was then flushed with fresh water to determine if the removed metals are "redistributed" or "redissolved" in the water (i.e. so called "rebound"). This measure determined the ability of the compounds to permanently remove the contaminants.

Table 2 lists the concentration of 3 contaminants over 27 days of treatment by ferrous cysteinate at three locations in the ASV.

TABLE 2

| Concentrations in Aqueous Phase (mg/L) | | | | | | | |
|---|---|---|---|---|---|---|---|
| FeC Port | Arsenic Day 5 | Arsenic Day 8 | Arsenic Day 13 | Arsenic Day 16 | Arsenic Day 20 | Arsenic Day 22 | Arsenic Day 27 |
| 1 | 25.8 | 10.9 | 6.8 | 3.6 | 3.3 | 1.1 | 0.6 |
| 5 | 23.1 | 9.8 | 6.8 | 3.5 | 3.0 | 0.9 | 0.5 |
| 10 | 23.9 | 7.7 | 5.4 | 2.8 | 2.9 | 0.8 | 0.5 |

TABLE 2-continued

Concentrations in Aqueous Phase (mg/L)

| FeC Port | Chromium Day 5 | Chromium Day 8 | Chromium Day 13 | Chromium Day 16 | Chromium Day 20 | Chromium Day 22 | Chromium Day 27 |
|---|---|---|---|---|---|---|---|
| 1 | NA | 5.8 | 3.4 | 1.4 | 0.7 | 1.1 | 1.0 |
| 5 | NA | 4.8 | 1.3 | 0.9 | 0.6 | 1.0 | 0.9 |
| 10 | NA | 5.2 | 0.8 | 0.6 | 0.5 | 0.9 | 0.7 |

| FeC Port | Copper Day 5 | Copper Day 8 | Copper Day 13 | Copper Day 16 | Copper Day 20 | Copper Day 22 | Copper Day 27 |
|---|---|---|---|---|---|---|---|
| 1 | 0.3 | 0.2 | 0.1 | 0.1 | 0.0 | 0.1 | 0.0 |
| 5 | 0.3 | 0.2 | 0.1 | 0.0 | 0.0 | 0.0 | 0.0 |
| 10 | 0.1 | 0.1 | 0.0 | 0.0 | 0.0 | 0.0 | 0.0 |

Cr concentration only was determined on day 30 (0.7 mg/l, 0.4 mg/l and 0.4 mg/l at ports 1, 5 and 10 respectively). Arsenic and chromium are slower to react than copper. This large scale experiment data is consistent with previous work in test tubes or microcosms. The quick reduction of copper concentration was expected as seen in Example B.

Table 3 lists the concentration of 3 contaminants over 27 days of treatment by sorbitol cysteinate at three locations in the ASV.

TABLE 3

Concentrations in Aqueous Phase (mg/L)

| SHC Port | Arsenic Day 5 | Arsenic Day 8 | Arsenic Day 13 | Arsenic Day 16 | Arsenic Day 20 | Arsenic Day 22 | Arsenic Day 27 |
|---|---|---|---|---|---|---|---|
| 1 | 26.3 | 20.2 | 9.0 | 4.1 | 3.2 | 1.3 | 0.6 |
| 55 | 25.7 | 18.0 | 6.7 | 3.6 | 2.9 | 1.0 | 0.5 |
| 10 | 24.9 | 11.6 | 3.6 | 2.6 | 2.4 | 0.8 | 0.5 |

| SHC Port | Chromium Day 5 | Chromium Day 8 | Chromium Day 13 | Chromium Day 16 | Chromium Day 20 | Chromium Day 22 | Chromium Day 27 |
|---|---|---|---|---|---|---|---|
| 1 | NA | 7.6 | 1.9 | 1.1 | 0.6 | 0.9 | 0.8 |
| 5 | NA | 6.4 | 1.0 | 0.8 | 0.5 | 0.8 | 0.8 |
| 10 | NA | 5.6 | 0.8 | 0.7 | 0.5 | 0.8 | 0.7 |

| SHC Port | Copper Day 5 | Copper Day 8 | Copper Day 13 | Copper Day 16 | Copper Day 20 | Copper Day 22 | Copper Day 27 |
|---|---|---|---|---|---|---|---|
| 1 | 0.2 | 0.2 | 0.1 | 0.0 | 0.0 | 0.1 | 0.0 |
| 5 | 0.1 | 0.2 | 0.0 | 0.0 | 0.0 | 0.0 | 0.0 |
| 10 | 0.2 | 0.1 | 0.0 | 0.0 | 0.0 | 0.0 | 0.0 |

Cr concentration only was determined on day 30 (0.7 mg/l, 0.6 mg/l and 0.6 mg/l at ports 1, 5 and 10 respectively).

A flow of fresh water was then maintained in the system and there were no increases in the Cr, Cu and As concentrations over the next 30 days.

We claim:

1. A compound consisting of an ester of an carboxylic acid of Formula I with a polyol:

wherein said polyol contains 2–8 OH groups;

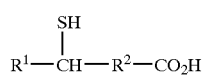

Formula I $R^1$ is lower alkyl;
$R^2$ is selected from the group consisting of lower alkyl, $-CHNH_2-$, $CH_2CHNH_2CH_2-$, $-CH_2CH_2CHNH_2-$, and $-CHNH_2CH_2CH_2-$; and
wherein two or more of the OH groups of said polyol are esterified.

2. The compound of claim 1 wherein the compound of Formula I is selected from the group consisting of methionine and cysteine and said polyol is selected from the group consisting of glycerol, xylitol, and sorbitol.

3. The compound of claim 2 wherein the compound of Formula I is cysteine and said polyol is sorbitol.

4. A compound consisting of an ester of a compound of Formula II with a polyol;

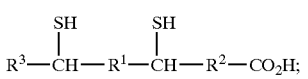

Formula II wherein said polyol contains 2–8 OH groups
$R^1$ and $R^3$ are lower alkyl;
$R^2$ is selected from the group consisting of lower alkyl, $-CHNH_2-$, $CH_2CHNH_2CH_2-$, $-CH_2CH_2CHNH_2-$, and $-CHNH_2CH_2CH_2-$; and
wherein two or more of the OH groups of said polyol are esterified.

5. The compound of claim 4 wherein the compound of Formula II is 6, 8-dimercaptooctanoic acid and said polyol is selected from the group consisting of glycerol, xylitol, and sorbitol.

6. A method of treating water and water-containing soils contaminated with metal by injecting or placing a decontaminating amount of a compound of claim 1 into said water or said water-containing soils.

7. The method of claim 6 further comprising:
   placing said decontaminating amount of said compound into a bed containing a substrate through which water flows; and
   allowing contaminating metals to interact with said substrate.

8. The method of claim 6 wherein release of organic acid of said compound occurs over a period of weeks or months from hydrolysis of the said compound.

9. A method of treating water and water-containing soils contaminated with metal by injecting or placing a decontaminating amount of a compound of claim 4 into said water or said water-containing soils.

10. The method of claim 9 further comprising:
    placing a decontaminating amount of said compound into a bed containing a substrate through which water flows; and
    allowing contaminating metals to interact with said substrate.

11. The method of claim 9 wherein release of organic acid of said decontaminating amount of said compound occurs over a period of weeks or months from hydrolysis of the said decontaminating amount of said compound.

* * * * *